United States Patent [19]

Langenbrunner

[11] Patent Number: 5,514,870
[45] Date of Patent: May 7, 1996

[54] FAST CSI-PHOSWICH DETECTOR

[75] Inventor: James R. Langenbrunner, 1024 Osage Cir., Santa Fe, N.M. 87501

[73] Assignee: James R. Langenbrunner, Santa Fe, N.M.

[21] Appl. No.: 212,710

[22] Filed: Mar. 11, 1994

[51] Int. Cl.⁶ .......................... G01T 1/202; G01T 1/203
[52] U.S. Cl. ........................ 250/367; 250/486.1
[58] Field of Search ................. 250/367, 486.1, 250/369

[56] References Cited

U.S. PATENT DOCUMENTS

| | | |
|---|---|---|
| H590 | 2/1989 | Chiles et al. ............... 250/367 |
| 2,650,309 | 8/1953 | Webb et al. . |
| 2,727,154 | 12/1955 | Goldsworthy . |
| 2,910,592 | 10/1959 | Armistead . |
| 3,299,267 | 1/1967 | Christianson et al. . |
| 3,566,118 | 2/1971 | Peters . |
| 3,898,463 | 8/1975 | Noakes ....................... 250/367 |
| 4,656,359 | 4/1987 | Persyk et al. ............ 250/486.1 |
| 4,843,245 | 6/1989 | Lecomte .................... 250/367 |
| 4,931,646 | 6/1990 | Koechner et al. ......... 250/367 |
| 5,171,998 | 12/1992 | Engdahl et al. ........ 250/363.02 |
| 5,317,158 | 5/1994 | McElhaney et al. ...... 250/367 |

FOREIGN PATENT DOCUMENTS 74890  3/1990  Japan ......................... 250/367

OTHER PUBLICATIONS

Langenbrunner, et al., "CsI-phoswich detector for charged-particle identification", *Nuclear Instruments and Methods in Physics Research*, A316, 450–451 (1992).

*Primary Examiner*—Carolyn E. Fields
*Attorney, Agent, or Firm*—Samuel M. Freund

[57] ABSTRACT

An improved phoswich radiation detector used pure CsI crystal and a fast plastic scintillator and a single photomultiplier tube. The plastic is arranged to receive incident radiation, and that which passed through then strikes the CsI crystal. Scintillation light from both the plastic and CsI crystal are applied to the photomultiplier tube, with the light from the plastic passing through the crystal without absorption therein. Electronics are provided for analyzing the output of the photomultiplier tube to discriminate responses due to the plastic and the CsI crystal, through short gate and long gate integration, to produce results which are indicative of the characteristics of the different types of incident radiation, even in the presence of large amounts of radiation. The phoswich detector has excellent timing resolution. The scintillators of the CsI- phoswich were chosen for their fast risetimes, of about 3 ns for NE102A, and 30 ns for the pure CsI.

1 Claim, 4 Drawing Sheets

FAST CSI-PHOSWICH DETECTOR

This invention was made with Government support under Grant number DE-FG02-87ER40362 awarded by the U.S. Department of Energy. The Government has certain rights in the invention.

FIELD OF THE INVENTION

This invention relates to the detection of nuclear radiations, including alpha ($\alpha$), beta ($\beta$), gamma ($\gamma$), neutron (n), and charged-particle species. The present invention provides a detector which is a combination of organic plastic scintillator and inorganic crystalline scintillator, with the property that particle detection and particle identification can be made relatively quickly compared to previous phoswich detectors.

BACKGROUND OF THE INVENTION

There is a scarcity of versatile detectors which are efficient for detecting $\alpha$, $\beta$, and $\gamma$ radiation. Such a detector should have applications as a research-quality detector, as well as applications for use in routine applications, such as monitoring nuclear material, monitoring polluted areas, and nuclear medicine with relatively unskilled workers (in comparison to nuclear and particle-physics experimentalist). The class of detectors called counting tubes (ionization chambers, proportional counters and Geiger-Mueller detectors) are commercially available for detection of $\alpha$, $\beta$, and $\gamma$, radiation. However, counting tube instruments are subject to a number of disadvantages. They are fragile for use in the field under harsh and unstable conditions. They are inefficient for detecting $\gamma$ rays (actually X-rays). Detection efficiency for $\gamma$ rays above 30 keV drops dramatically for proportional counters. Where there are both alpha and beta radiation present together, there is little chance of finding the amount of beta radiation without extra equipment, since alpha radiation dominates the detector response. The need for a versatile detector arises from requirements including physical limitations, cost effectiveness and simplicity.

Another class of detectors in the prior art employ a combination of scintillators, in series, such that the scintillation light from each scintillator is detectable by a single photomultiplier tube. Because their configuration is essentially a 'sandwich of phosphors', such detectors are often referred to as 'phoswich' detectors. Differentiation phoswich detectors operate on the principle that the response of one scintillator is separable from the response of the other scintillator, and also separable from the response of the combination. The method of achieving this separation has been to optically couple a scintillator with slow response to a scintillator with fast response, such that their responses can be separated.

Plastic scintillators have low atomic number, and are efficient detectors of $\beta$ radiation. In this regard, plastic scintillators are more efficient than high-Z materials, because the latter tend to backscatter electrons. Plastic scintillators also have a major advantage in that they are flexible, and are used in varied applications. Their low density and low atomic number, however, render them less effective with $\gamma$ radiation.

Inorganic crystal scintillators have medium to high stopping power due to their high density and atomic numbers. This, and other attributes, make them suitable for detecting $\gamma$ rays. Examples include $BaF_2$, $CeF_3$, $CsF_2$, CsI(TI), CsI(Na), $Bi_4Be_3O_{12}$ (BGO), ZnS(Ag), and NaI(TI). NaI(TI), CsI(TI) are alkali-halide crystals doped with a small molecular concentration of thallium ($\sim 10-3$ TI). The thallium doping induces the CsI(TI) crystal to emit light in the wavelength region around 500 nanometers, and that light has a decay constant of between 0.3 to 1.0 microseconds. CsI(pure) is growing in popularity for research, because of its excellent response time, its ability to be grown into large quantities, and cost, among other attributes.

A combination of scintillators, provides properties of versatile particle detection which have been utilized in other inventions. Goldsworthy (U.S. Pat. No. 2,727,154) utilizes two crystals in combination. Constraints on its use include the tasks of changing voltage, and changing the window through which radiation is incident. Christianson (U.S. Pat. No. 3,299,267) utilizes two luminophores, essentially two plastic scintillators in combination, with the limitation that $\gamma$ rays are detected efficiently only if they are below a maximum energy of about 20 keV. Ciles et al. (U.S. Statutory Invention Registration H590) utilizes a thin glass in combination with a thick plastic, The result of this combination is a tradeoff between the bulk of the detector with the efficiency of $\gamma$-ray detection.

In most prior art phoswich detectors, the fast response scintillator is placed ahead of the slow one, i.e., the fast response one is the first to be struck by the radiation. In a more recent development, I proposed the use of a CsI crystal as the fast phosphor, and a reverse of the arrangement so that the slow plastic scintillator was positioned first and the fast CsI crystal second. This arrangement was proposed to take advantage of the high speed properties of CsI, but that type of detector proved to have certain disadvantages involving longer decay, due to the signal decay time of perhaps 300 nanoseconds for the plastic scintillator, and poor timing resolution due to the slow rise time of the plastic scintillator pulse.

SUMMARY OF THE INVENTION

The present invention solves the above noted problems by a unique combination of detector materials in a phoswich detector, to take advantage of the fast response of CsI. According to a principle of the present invention, many available plastic scintillators are unsuitable for use with CsI crystal, for a number of reasons. However, by optimally matching properties, the present invention provide an improved phoswich detector which can take advantage of the speed of pure CsI crystals while providing improved rapid detection over a wide range of radiation types and range of event rates.

According to one feature the invention, phoswich detector is provided using two fast scintillators, optically coupled and viewed by a single photomultiplier tube (PMT). Electronic circuits are provided to discriminate and detect a broader range and variety of radiation than was previously possible through other available detectors.

The first element, upon which the radiation is incident, is a plastic scintillator chosen to have a response time an order of magnitude faster than the response time of the CsI crystal, which is used as the second element. The plastic scintillator has a wavelength of light which is transmitted, and not substantially absorbed in the CsI crystal. If the radiation is not stopped traversing the plastic, it is then incident upon the CsI crystal. The function of the photomultiplier tube is to produce an amplified electronic signal (voltage and current) proportional to the light output from the scintillators. The CsI crystal is wrapped in a diffuse reflector, whereas the front face of the plastic is wrapped in a specular reflector (through which the radiation must usually traverse).

An object of the present invention is to detect several particle species, such as α and β radiation, as well as, for example, proton and pion particles, and uncharged radiation, such as γ and n. It is therefore an object of this invention to be versatile by virtue of the materials used, and their placement, the materials having scintillation qualities. It is further an object of this invention that the materials be compatible in their time-ordered combination, to provide particle detection where event rates are extremely high, where there are several types of radiations present, and where high background rates are encountered.

A phoswich detector thus instructed according to the present invention is capable of faster response than any other detector (the plastic scintillator alone would of course be faster, but would not provide discrimination). The invention can also classify more types and energies of particles alpha, beta, gamma and neutron, when present simultaneously in mixed radiation environments, than other detectors.

DETAILED DESCRIPTION OF THE PREFERRED EMBODIMENT

Many of the advantages of this detector lie in the advantages conferred by the use of CsI(pure) as its crystal component. BGO, NaI(Tl) and CsI(Tl) have good stopping powers (radiation lengths 1.1, 2.5, 1.8, [cm] respectively) but are of only moderate speed (decay times about 300 ns). CsI(pure) is characterized by a decay time of about 30 ns. This time constant is an order of magnitude faster than the others, which is desirable, especially in combination with a fast plastic scintillator. Compared to other "fast" crystals, BaF2 and CeF3, CsI(pure) is easy to grow, and has been produced in large quantities. CsI is largely resistant to radiation, virtually non-hygroscopic, and mechanically desirable. Anthracence is an organic crystal which could be considered as a substitute for CsI(pure) because of its decay time of about 30 ns. However, its amplitude is anisotropic due to channeling effects, and its density and atomic number is low compared to CsI.

An advantage of this detector is that it is substantially faster than previous phoswich detectors. Compared to the detectors cited above, the fast CsI-phoswich detector is ten times faster for comparable performance. An advantage of the detector is that particle identification can be made of each of these radiation types, even in the event that radiations of several different species are mixed one with the other.

Because of its speed the fast CsI-phoswich can be used in environments unsuitable for any other type of detector. It can be used in radiation environments where radiation is ten times greater than is presently possible. The speed of the detector is well suited for coupling the detector to solid state electronics, which could easily render this detector portable.

One advantage of speed of this detector is timing resolution. The fast CsI-phoswich is capable of ±0.5 ns time resolution, making this detector an excellent choice in many research applications. That is, not only does the detector respond and recover quickly, but the detector responds with very little variation (jitter) in time.

This speed makes "pile-up" less likely as well. When radiation types are mixed, one type more prevalent than another, the radiation of the second type may be missed completely, (due to detector dead-time), or may pile-up. The ensuing signal is neither a reflection of one or the other radiation and is a artifact which leads to misdiagnosis of the radiation environment.

Each example of phoswich detector cited above (and all others which compose the prior art) are limited by the decay constant of the scintillator component which decays most slowly. The time with which the slowest scintillator pulse decays limits the rate at which the detector can detect particle events, without piling one pulse on a subsequent pulse. The fast-CsI phoswich is clearly preferred for many situations.

Figure 1A:
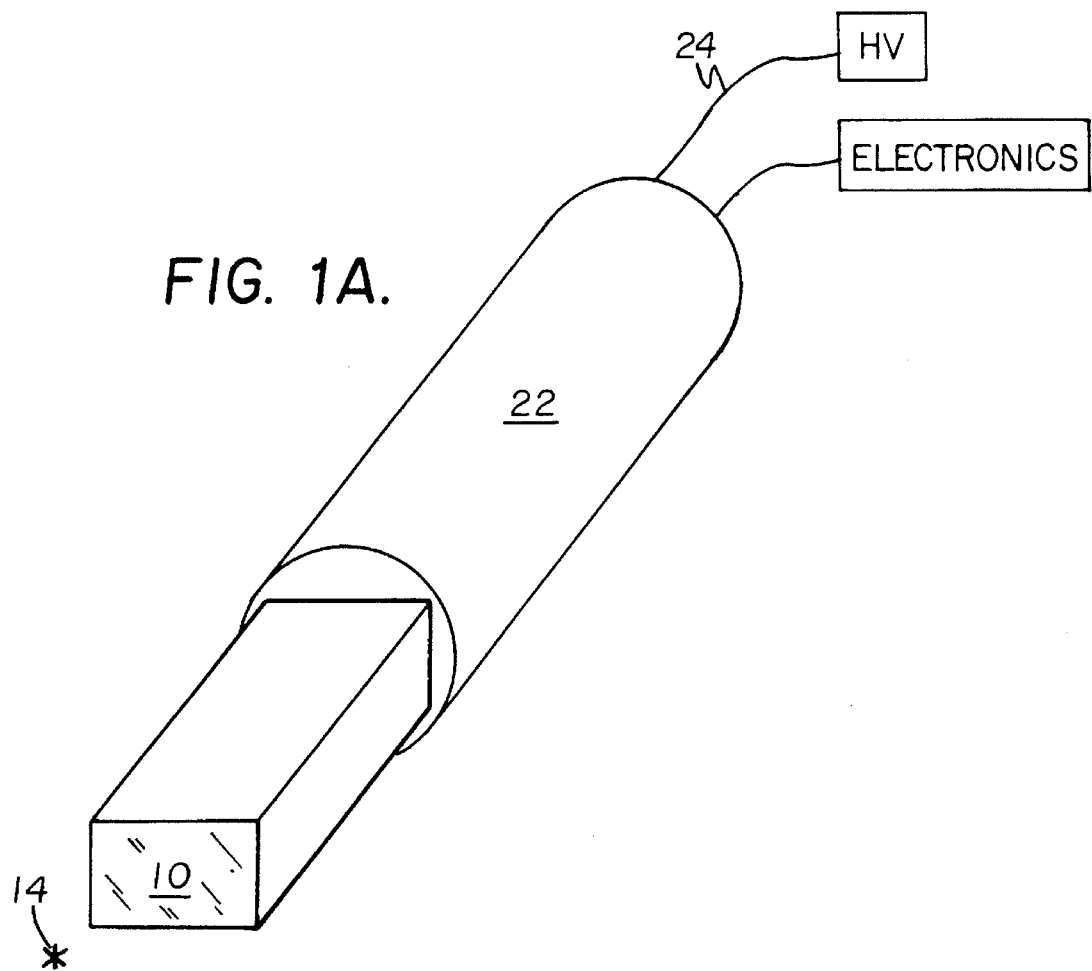
FIG. 1A is a diagrammatic view and perspective of a phoswich detector according to the present invention.
Figure 1B:
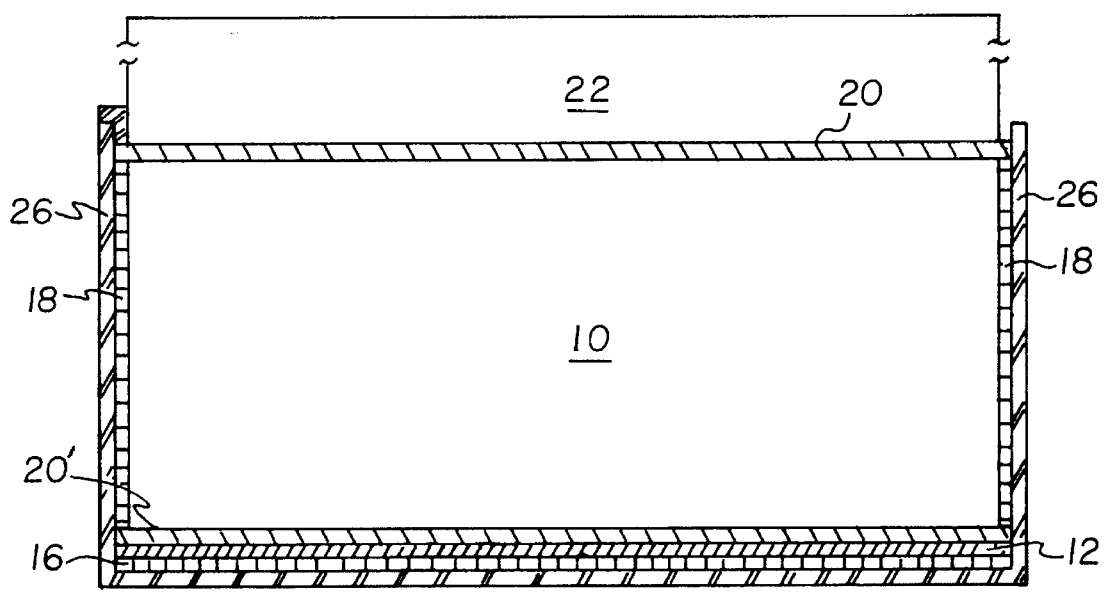
FIG. 1B is a cross-sectional view, at an enlarged scale, showing the relationship of the plastic and crystal scintillators.

Referring now to FIGS. 1A and 1B (not to the same scale), the phoswich detector includes a sandwich structure of fast plastic scintillator 12, CsI crystal 10, and the photomultiplier tube and base assembly 22. Photomultiplier tube 22, as is generally known in the art, is supplied with high voltage via cable 24 from a suitable high voltage power supply as is generally known in the art. Output signals from photomultiplier tube 22 are conveyed over cable 28 to electronic assembly 30, discussed in greater detail below.

In the preferred embodiment, the fast plastic scintillator 12 is a material known as NE102A from Nuclear Enterprises. This material has a response time an order of magnitude faster than the CsI crystal, and emits light of a wavelength that is transmitted well through the CsI crystal, without excessive absorption or reflection. The CsI is pure crystal, which has physical properties that make its use highly advantageous. It is extremely resistant to radiation damage and virtual non-hygroscopic and does not fracture easily. The transportation, packaging and use of CsI-phoswich is vastly simplified because of these properties. Their resistance to radiation makes it highly improbable that pure CsI crystals would have to be refurbished during the lifetime of the detectors.

As seen in the figures, the specular reflector 16 is placed over plastic scintillator 12, which is optically coupled to a face of CsI crystal 10 by optical coupling or cement, preferably that sold under the name SYLGARD from Dow Chemical. The opposite face of crystal 10 is also optically coupled as by SYLGARD 20 to the sensing face of photomultiplier tube 22. The sides of the crystal are wrapped with a diffused light reflector 18, and the whole phoswich is wrapped with a light-tight wrapping 26. Light type diffuse reflector 18 can be white, such as TEFLON™ from DuPont wrapping, and the specular layer 16 can be thin aluminized material, such as MYLAR™ from DuPont (on the order of 0.17 mg/cm(2)). The wrapping 26 must be made to be light-tight, and is preferably made of a material called Tedlar from DuPont.

Radiation is incident from the direction indicated in the Figures by reference number 14, such that it hits plastic scintillator 12 first, then crystal 10.

The light due to the plastic scintillator travels the length of the crystal to the photomultiplier tube, is separable from the light produced by the CsI crystal, because of the differing decay responses. The design can have varying thicknesses of the fast plastic scintillator 12 and the CsI scintillator 10.

OPERATION

The working principle of the fast CsI-phoswich detector is that scintillation light from fast-plastic as well as the light from the CsI crystal can be viewed by a single photomultiplier tube. The tube and means of analyzing the signal must be capable of distinguishing plastic scintillation light from crystal scintillation light, as well as distinguish light from a combination of both light simultaneously emitted. This detector uses the time constant of the rise and fall of the voltage signals (or equivalently, the integrated current) to distinguish, and this is largely separate from the pulse-height of the various signals. From simple signal analysis, achievable with transistor circuit means, this detector can distinguish between $\alpha$, $\beta$, $\gamma$, and n radiation. From a pulse-height analyses, spectroscopy measurements can be made on $\beta$ and $\gamma$-events. Resolution of $\gamma$ rays is dependent on the size of the CsI crystal.

Figure 2:
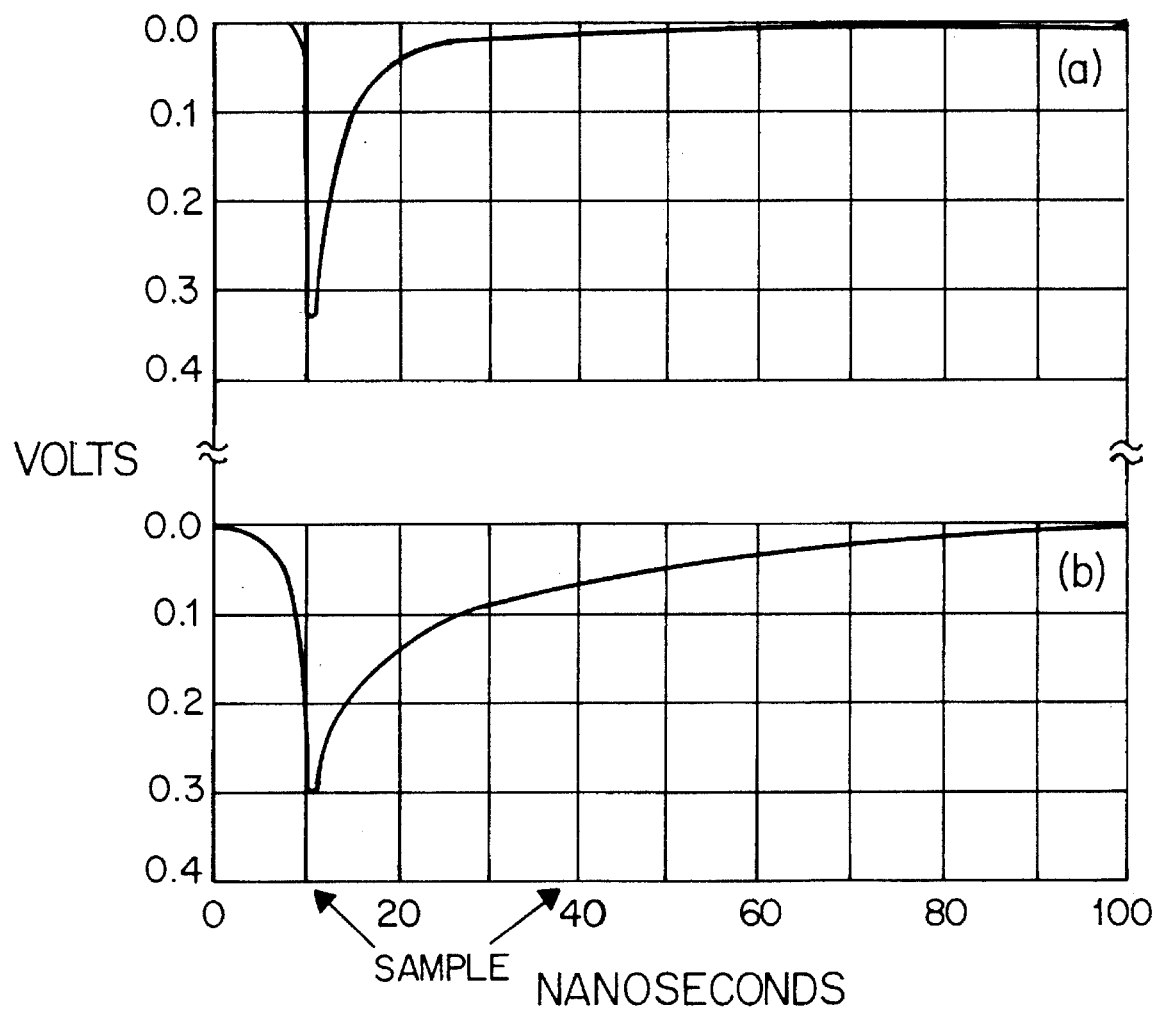
FIG. 2 show response waveforms of the plastic and crystal scintillators to beta radiation.

With reference to FIG. 2, the response of the plastic and crystal scintillators is illustrated, in the case of beta radiation. Graph (a) shows the response of a PMT from scintillation light from the plastic alone due to incident beta radiation. Graph (b) similarly shows the response of a PMT from scintillation light from the CsI crystal alone due to incident beta radiation. In the phoswich of the present invention, light may be produced by both the plastic and the crystal, such that the waveform of light received by the PMT may (depending on the nature of the radiation) be some combination of the two curves.

There are two methods of operation of the dector for particle identification. One method is to sample the voltage alone at two time points on the curve. The other method is to integrate the charge over two time periods: integration over a short time; and integration over a longer time ('long gate'). Charge integration is the preferred method, and will be described.

By integrating the current of the PMT response for a short time a ('short gate') and a longer time ('long gate'), information can be obtained about the radiation. In the preferred embodiment, the time for the short gate is 10 ns, and the time for the long gate is 40 ns.

The PMT voltage can be sampled as opposed to integrated, for example at 10 ns and 40 ns as indicated in FIG. 2. However, different values can be used, and it is believed that the difference in the range of 30 ns is more important than the actual values such as 10 or 40 ns. Improved accuracy results if the PMT waveform is integrated, and the integrated voltage for the shod gate and long gate is used.

Figure 3:
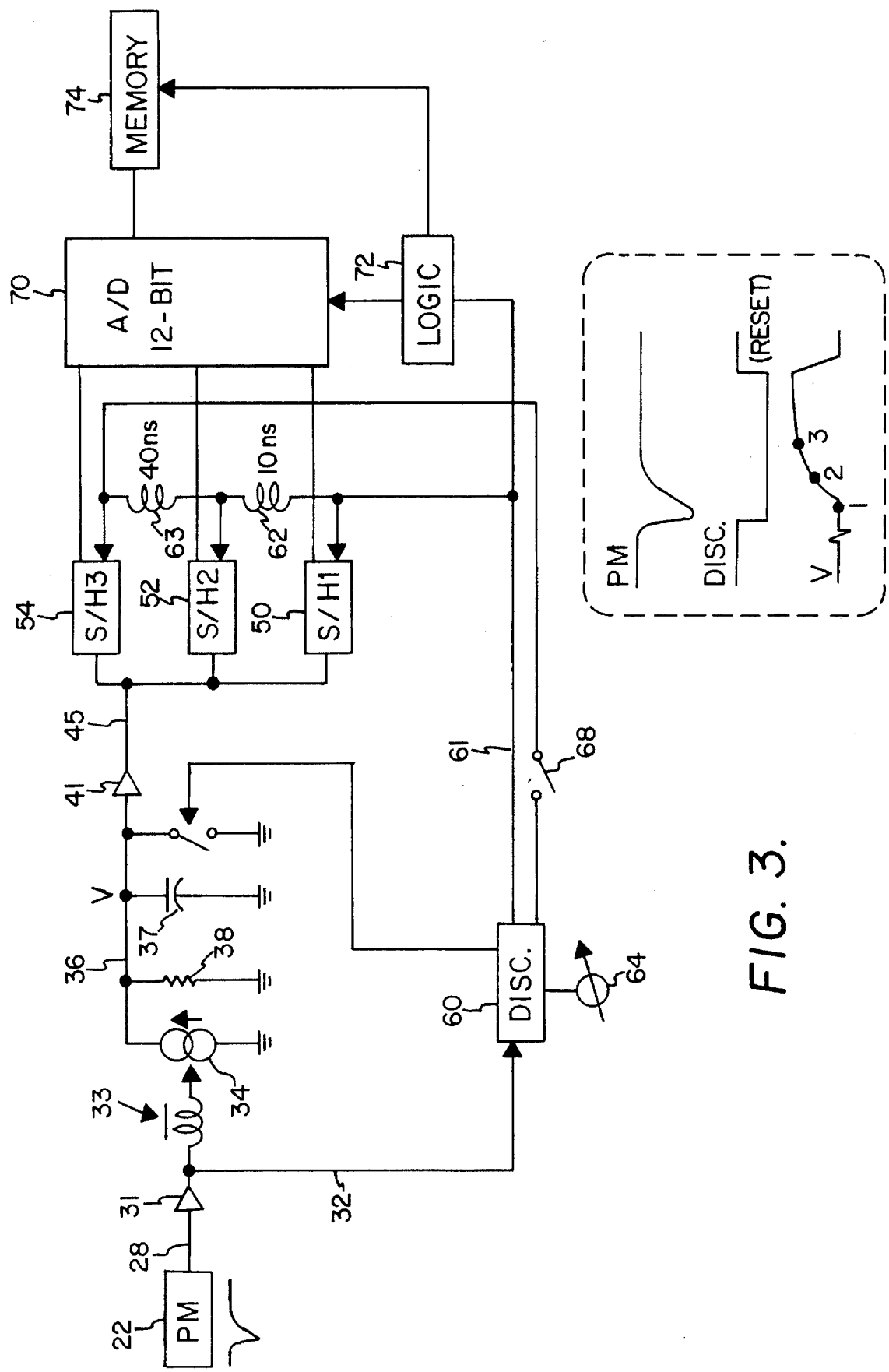
FIG. 3 shows a schematic diagram of electronics for use with the detector.

FIG. 3 shows the electronics for an embodiment of the invention. The output of photomultiplier tube 22 is conveyed by a conductor 28 to an input amplifier 31. The signal output from amplifier 31 is applied through a variable delay element 33, consisting of an adjustable length of conductor for timing purposes. The signal then is applied to control a current source 34. The output of current source 34 is applied to conductor 36, where it charges capacitor 37. The voltage at conductor 36 is also applied to an amplifier 41. It will be appreciated that current source 34 and capacitor 37 provide an integration function for a voltage signal applied to amplifier 31 from the photomultiplier tube 28. Resistor 38 is part of a time constant for capacitor 37. A switch 42 is provided for resetting the integrator as explained below.

The output of amplifier 41 is applied to three sample and hold circuits 50, 52, and 54. These sample hold circuits are used to sample the waveform produced by an event, as indicated below. Timing is provided by discriminator 60 and a pair of delay elements 62 and 63. Discriminator 60 functions as a threshold triggering device to detect the beginning of the rise of a waveform from the photomultiplier tube. A branch of the lead 32 from amplifier 31 connects to discriminator 60, as does a threshold setting device 64. The function of threshold device 64 is to adjust the triggering point of discriminator 60 to be just above the noise level of the system, such that upon occurrence of an event detected by photomultiplier tube 22 discriminator 60 provide an enable signal on lead 61 to sample and hold circuit 50. This then causes sample-hold 50 to take a reading from the voltage at lead 45 from the integration circuit. The use of variable delay 33 insures that this will occur at the base level, rather than at the beginning of waveform as is indicated by 0.1 on the waveforms of FIG. 3. As the waveform builds up through the integrator, after the delay provided by delay 62, sample-hold 52 takes a sample at the point indicated by FIG. 2 in the waveform, and subsequently after the delay provided delay 63, sample-hold 54 takes its sample at the point indicated in by reference number three.

These sampled voltages are applied to an analog/digital converter 70, which is activated by suitable logic 72 after the final sample is taken, so that the sample values are digitized and applied to a computer memory 74 for processing an eventual display. Subsequent to the sampling cycle, discriminator 60 can provide a reset signal on lead 66 which activates switch 42 to remove the charge from capacitor 37, so that the circuit is ready for the next detected event. A manual reset/holdoff switch 68 can be provided too manually reset the system and disable it.

The waveforms shown in conjunction with FIG. 3 illustrates the operation as described above. The curve labelled PM shows a waveform resulting from an event which produces light in one or the other or both of the scintillator. The waveform labeled DISC shows the action of the discriminator circuit 60, and the waveform "V" shows the integrated waveform voltage V, with the three sample points previously discussed.

Fast timing is essential to make pile-up less probable in a high-radiation environment, and for timing resolution. A detector designed for a research experiment could process event rates between one and ten megahertz, far superior to previous phoswich designs. This phoswich detector has excellent timing resolution (the smallest time interval that can be measured with accuracy, about 1 ns) because of very fast risetimes, which reduce timing jitter. The scintillators of the CsI-phoswich were chosen for their fast risetimes, of about 3 ns for NE102A, and 30 ns for the pure CsI. This is believed to produce the fastest phoswich proven to work.

Figure 4:
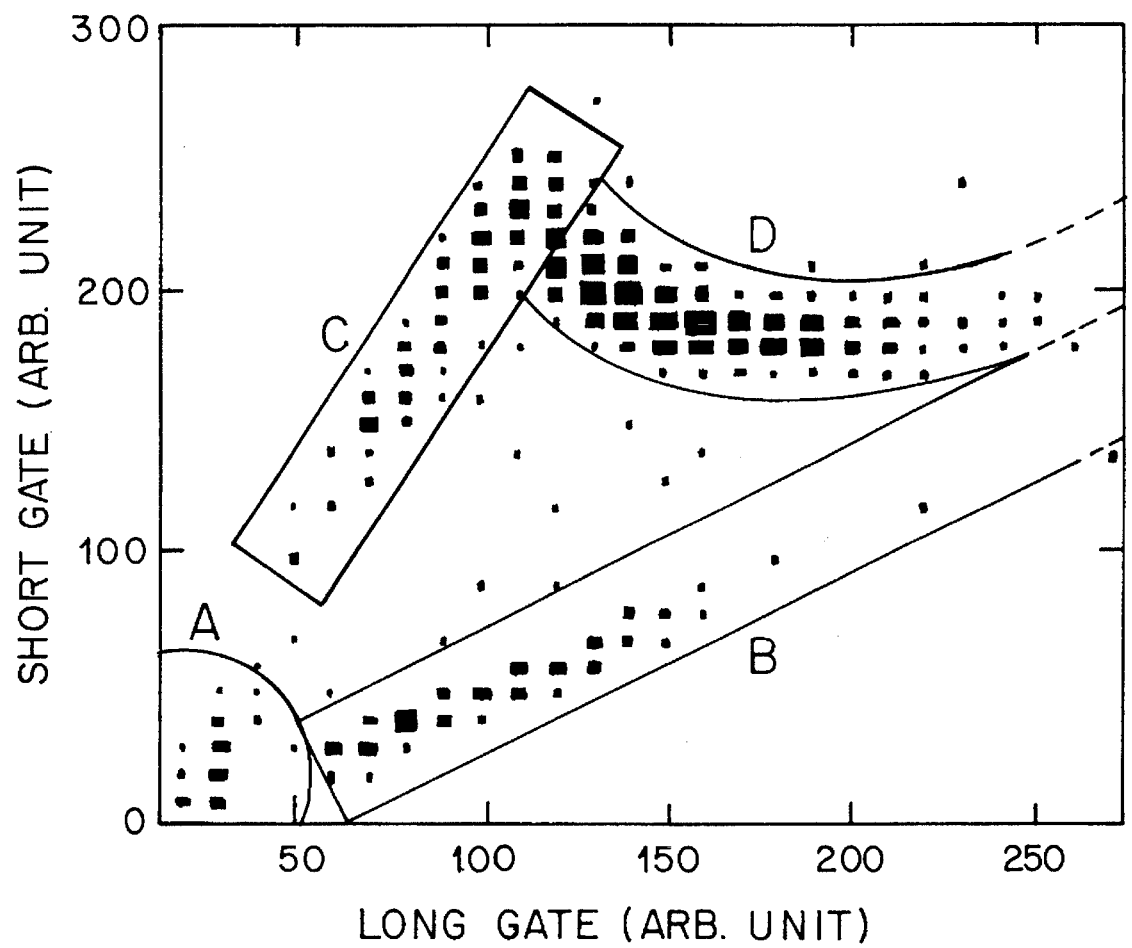
FIG. 4 is an xy plot illustrating identification of different radiation types detected by detector of the present invention.

A scatter plot (2-dimensional histogram) is illustrated for the CsI-phoswich detector in FIG. 4 where the ordinate is the charge integrated over a "short time" (short gate) and the abscissa is the charge integrated over the "long time" (long gate). The calculations necessary to product this are easily done by an electronic processor on the stored data in memory 74, and the resulting plot can be displayed on any suitable electronic display such as an x-y oscilloscope or a computer screen. The fast-plastic phoswich has good timing resolution (the smallest time interval that can be measured with accuracy) because of its fast risetime, which reduces jitter.

Because FIG. 4 represents quantized data which has been fit into groups, the occurrences are represented by squares. The zone of a square represents the radiation type, as discussed below. The 'weight' of a square represents the count of events of a particular type and energy, and the exact position of the square is indicative of the energy.

Regions of this spectrum FIG. 4 indicate the nature of radiation observed by the detector. In region A, charged particles are stopped in the plastic, and produce little light output. Region A is the region that will be excited by alpha radiation. Region B is the region of vanishing signal from the plastic, i.e. gamma and neutron radiation. Region C and D are the regions of beta radiation. In region C, the beta particles are stopped in the plastic scintillator, and region D has the light of both plastic and CsI, i.e. beta particles that have "punched through" the plastic. Please note that the regions identified above are indicative of the predicted response of the detector to nonmonoenergetic alpha, beta and gamma radiation. Region A in the spectrum below corresponds to deuterons of a few MeV, region B corresponds to gamma and neutron radiation, and regions C and D correspond to protons.

An example of an algorithm for particle identification purposes is as follows:

Let the integrated light output, resulting in a voltage signal from the photomultiplier tube be denoted by E. E is proportional to V (voltage) at specified times, t1 and t2, denoted by $V(t1)=V1$, $V(t2)=V2$. For example, let $t1 \approx 10$ ns, and $t2 \approx 40$ ns.

For radiation incident on the plastic, and causing only the plastic to scintillate (the scintillation light is transmitted through the crystal), there is an associated constant $\alpha$ such that $\alpha=V1/V2$. Thus, $\alpha$ carries pulse-shape information.

For CsI scintillation alone, $V1/V2=\beta$ is a different constant because the pulse shape is different.

The information carried by $\alpha$ and $\beta$ can be used to form the equation for a line, where the variable y is the ordinate, and E is the integrated charge, the abscissa, (E is the traditional energy information of previous detectors).

For the plastic alone;

$y = \alpha E + \text{Constant}$ (plastic)

For CsI alone;

$y = \beta E + \text{Constant}$ (CsI)

In a plot of y versus E, these two lines will be separated, and identifiable, because $\alpha$ and $\beta$ are different; $\alpha > \beta$ as can be seen from FIG. 2.

The constants $\alpha$, $\beta$, Constant (plastic), and Constant (CsI) can be determined from experimentation, can be calibrated, and be corrected for changes of temperature. Particle identification is accorded for by using the discussion of cases in the following examples and noting the position of radiation-induced events with respect to the lines above. This information is provided by the fast CsI-phoswich in addition to the traditional energy information denoted by E.

EXAMPLES

The cases below are based on the phenomena of scintillation light resulting from the interaction of radiation with matter. The interaction of radiation with scintillators is different for each of the scintillators, and depends on the radiation type as well. These differences are exploited to identify the type of radiation.

CASE 1: Detecting Beta Radiation (generalizable to "Detecting Charged Particle Radiation")

Beta radiation, electrons, are produced in the same decay chains as those which produce alpha particles. A CsI-phoswich system is able to detect beta radiation because the detector does not need a special, thick housing. A thin wrapping need be only light tight will serve. Electrons pass through a thin, light-tight wrapping and are incident on the plastic, causing the plastic to scintillate. Further, electrons that are energetic enough to pass through the plastic will normally cause the CsI crystal to scintillate. See FIG. 2. An electronic circuit can distinguish between the two pulse shapes, 2(a) and 2(b). If the electrons stop in the plastic, they produce the signal as in 2(a). If electrons pass through the entire thickness of the plastic, and are incident on the CsI crystal, then the detector response is a sum of signals proportional to both those signals shown in FIG. 2(a) and 2(b).

CASE 2: Detecting Alpha Radiation

Alpha particles are highly ionizing particles. The low-energy alpha particles found in the decay chains of heavy nuclei have a small mean free path. Alpha particles can be emitted from heavy nuclei and have kinetic energy around 6 MeV. While the alpha particle can ionize any phosphor scintillator, the overriding concern in detecting alpha particles with a scintillation detector is the ability to place the detector close to the source of the radiation. Alpha particles produce small light output from scintillators, and produce signals near the threshold. In this case, the voltages are small, and subject to noise, but mainly propodional to FIG. 2(a) alone if the alpha particles are incident on the plastic.

CASE 3: Detecting Gamma Radiation

The probability of converting the gamma-ray in the plastic scintillator and in the CsI crystal is easily calculated, and depends on the thickness of the scintillators, a quantity that can be manipulated with high precision. As gamma-rays interact with matter, in general they are not attenuated in energy but rather attenuated in number. This is the phenomena which we exploit. Some gamma rays (a calculable amount), interact with the plastic and those that penetrate the plastic could interact with CsI. The gamma rays are attenuated in number, not in energy. For an incident beam $I_0$ of gamma rays, we can apply the following equation, where $\mu_T$ is the inverse mean-free-path length for interaction and x is the scintillator thickness:

$$I = I_0 \exp(-\mu_T x)$$

As an example, consider the prominent gamma-ray decay of uranium-235, which has gamma-ray energy of 0.186 MeV. The value of PT for plastic and CsI (dimensions of $cm^{-1}$)

| gamma-ray energy 0.186 MeV | $\mu_T$ plastic 0.16 $cm^{-1}$ | $\mu_T$ CsI 8.2 $cm^{-1}$ |
| --- | --- | --- |

As an example, when the plastic thickness is 2 cm, $I/I_0 = \exp(-\mu_T x) = 0.73$, which means that 27% of the gamma rays interacted with the plastic scintillator, and 73% traversed 2 cm of plastic (unattenuated in energy) and could interact with the CsI crystal. For this example, 27% of the total number of gamma rays which are incident on the plastic scintillator are identifiable as proportional to FIG. 2(a). A similar calculation can be made using $\mu_T$ and x for CsI, noting that $I_0$ must now be reduced by the proportion of gamma rays which have been converted to scintillation light by the plastic. Those gamma rays which traverse the plastic and convert in the CsI cause a signal in proportion to the signal of FIG. 2(b).

$I/I_0$ can be carefully manipulated for the scintillators, because the values are proportional to the thicknesses of the materials, (which can be determined with great accuracy); the thicknesses of the scintillator materials of this invention can be changed to optimize the embodiment to detect a given isotope.

The method of calculating gamma-ray energy by identifying $I/I_0$ for particular phoswich scintillator material thicknesses appears to be a general strategy, and an independent observable, useful with any sort of phoswich system. It is believed this has never before been used for phoswich detectors. A similar method of particle identification is taught for fixed-thickness scintillators, in U.S. Pat. No. 4,931,646 of Koechner. That detector has fixed thickness scintillator cables, and uses a photomultiplier for each separate scintillator cable.

This strategy is useful for identifying gamma radiation especially when there is gamma radiation in the presence of neutron or charged-particle radiation. This method can be applied to beta radiation as well, and could be developed as an isotope signature when many radioisotopes are mixed together.

CASE 4: Detecting Neutron Radiation

Detecting neutrons requires that the neutron transfer a measurable amount of kinetic energy to a particle that is capable of ionizing the detector. The nuclear reaction "neutron in, proton out" is a scattering reaction designated (n,p) and is most likely in hydrogenous materials, like plastics, and organic materials, plastics are used in fast neutron detection because of their large hydrogen content. Signals from (n,p) reactions will be propodional to FIG. 2(a) if the scattered proton remains in the plastic; if the scatter proton enters the CsI, the signal is the sum of a signal proportional to 2(a) with a signal proportional to 2(b).

For thermal neutrons (low-energy neutrons) the nuclear reaction (n,gamma) wherein iodine captures a neutron and emits a gamma ray, is indicative of thermal neutrons. Iodine-127 (the abundant isotope) has a large thermal neutron absorpotion probability. CsI is sensitive to neutrons because the iodine-127 "captures neutrons" and then decays with gamma-emission (6.8 Me V) (half-life of 25 minutes).

Therefore, fast neutrons can be detected using the (n,p) reaction using the plastic scintillator as a source of hydrogen for the (n,p) scattering reaction. A 6.8 Me V gamma from the decay of Iodine-128 will indicate thermal neutron activity. That gamma ray emission (6.8 Me V) reduces to one-half of its value in 25 minutes, which could be a redundant but usable indicator of neutron activity. Capture-gamma rays, due to thermal neutron capture by iodine-127, are present mainly as event signals proportional to FIG. 2b.

A use of this detector would be to monitor in area where there is undeclared nuclear activity. The undeclared nature of venue requires that a monitoring system be able to detect virtually any type of radiation, that is, be versatile. The strength of this technology is based on its versatility. The fast CsI-Phoswich Detector can detect alpha, beta, gamma, and neutron radiation. The advantages of this technology, depending on the embodiment, include:

1. Real-time operation without the necessity of a computer, using instead dedicated electronics consisting of one photomultiplier tube, a circuit and microprocessor-based signal processing and data storage.

2. Particle identification for alpha, beta, gamma, and neutron radiation,

3. The nature of the fast CsI-Phoswich allows for an observable quantifying particle energy based on the thickness of the scintillators (an independent observable), that is, not based on the traditionally used information, 4. Elimination of bulky collimators for certain uses, 5. The nature of fast CsI-Phoswich allows for an embodiment which provides a two-dimensional readout for on-site visual analysis.

An example of an advantage of the present invention, compared to NaI(TI), is that NaI is hygroscopic, and must be packed in aluminum to keep water out. Germanium detectors must be cooled by liquid nitrogen for operation and is likewise enclosed. Those detectors could not detect, for example, the beta radiation from strontium-90, (a long-lived fission isotope, halflife of about 30 years) which would indicate nuclear activity after most other radionuclides have decayed.

In summary, the present invention provides a fast response phoswich radiation detector having improved features and performance, as described above, which are superior to those found in prior art devices.

I claim:

1. A fast phoswich detector, comprising a CsI crystal scintillator, a plastic scintillator which has a response time one order of magnitude faster than the CsI crystal scintillator and which emits light of a wavelength which is transmitted by the CsI crystal without substantial absorption, the thickness of the CsI crystal scintillator and the thickness of the plastic scintillator are chosen to allow for the detection of at least three different radiation types, a photomultiplier tube (PMT), means positioning the scintillators and the PMT such that radiation incident on the phoswich detector strikes the plastic scintillator first, and such that light from the plastic scintillator and the CsI crystal are directed to the PMT, and detection electronics for discriminating from the output of the PMT, responses of each scintillator alone and/or in combination, to thereby provide an indication of the type of incident radiation.

\* \* \* \* \*